(12) United States Patent
Tsai (10) Patent No.: US 7,867,967 B2
(45) Date of Patent: Jan. 11, 2011

(54) MIXTURE ARTICLE FOR CLEANING SUPERFICIALLY-ADHERED SUBSTANCES

(75) Inventor: Guan-Chang Tsai, Changhua (TW)

(73) Assignee: Huei Zong Hang Co., Ltd., Changhua (TW)

( * ) Notice: Subject to any disclaimer, the term of this patent is extended or adjusted under 35 U.S.C. 154(b) by 657 days.

(21) Appl. No.: 11/826,824

(22) Filed: Jul. 18, 2007

(65) Prior Publication Data

US 2009/0019781 A1    Jan. 22, 2009

(51) Int. Cl.
*C11D 7/24* (2006.01)
*C11D 7/20* (2006.01)
*C11D 7/60* (2006.01)
*C09K 3/14* (2006.01)

(52) U.S. Cl. .................. 510/241; 510/365; 510/407; 51/307

(58) Field of Classification Search .................. 51/298, 51/307; 451/66; 510/365, 407, 241; 106/3
See application file for complete search history.

(56) References Cited

U.S. PATENT DOCUMENTS 6,737,394 B2 *    5/2004    Shana'a et al. .............. 510/417

\* cited by examiner

*Primary Examiner*—Jerry Lorengo
*Assistant Examiner*—Jared Wood
(74) *Attorney, Agent, or Firm*—Senniger Powers LLP (57) ABSTRACT

A mixture article for cleaning superficially-adhered substances consists of colloid material (25 wt %-60 wt %), resin (10 wt %-20 wt %), abrasive powders (15 wt %-30 wt %), stabilizer, fibers, and natural turpentine that are bonded together to form a mixture article having high density and high binding, cohesive and adhesive capacities as well wherein the natural turpentine has the property that can greatly reduce the manufacturing temperature in the processing of the mixture article and lower the emission of exhaust to fit to environmental protection benefit thereby. The abrasive powders are utilized to boost the suction power between the mixture article and a working surface so as to shovel up substances adhered onto the working surface thereon. Besides, the colloid material and the resin are equipped with the adhesion property to viscously grip the substances bonded onto the working surface so as to remove them there-from for cleaning purpose.

12 Claims, 9 Drawing Sheets

MIXTURE ARTICLE FOR CLEANING SUPERFICIALLY-ADHERED SUBSTANCES

BACKGROUND OF THE INVENTION

The present invention relates to a mixture article for cleaning superficially-adhered substances, consisting of colloid material, resin, abrasive powders, stabilizer, fibers, and natural turpentine that are bonded together to form a mixture article having high density and high binding, cohesive and adhesive capacities as well; whereby, to clean superficially-adhered substances, the mixture article is easily exerted by wiping to remove substances toughly adhered onto a working surface, economically saving both time and energy for cleaning thereof.

Figure 1:
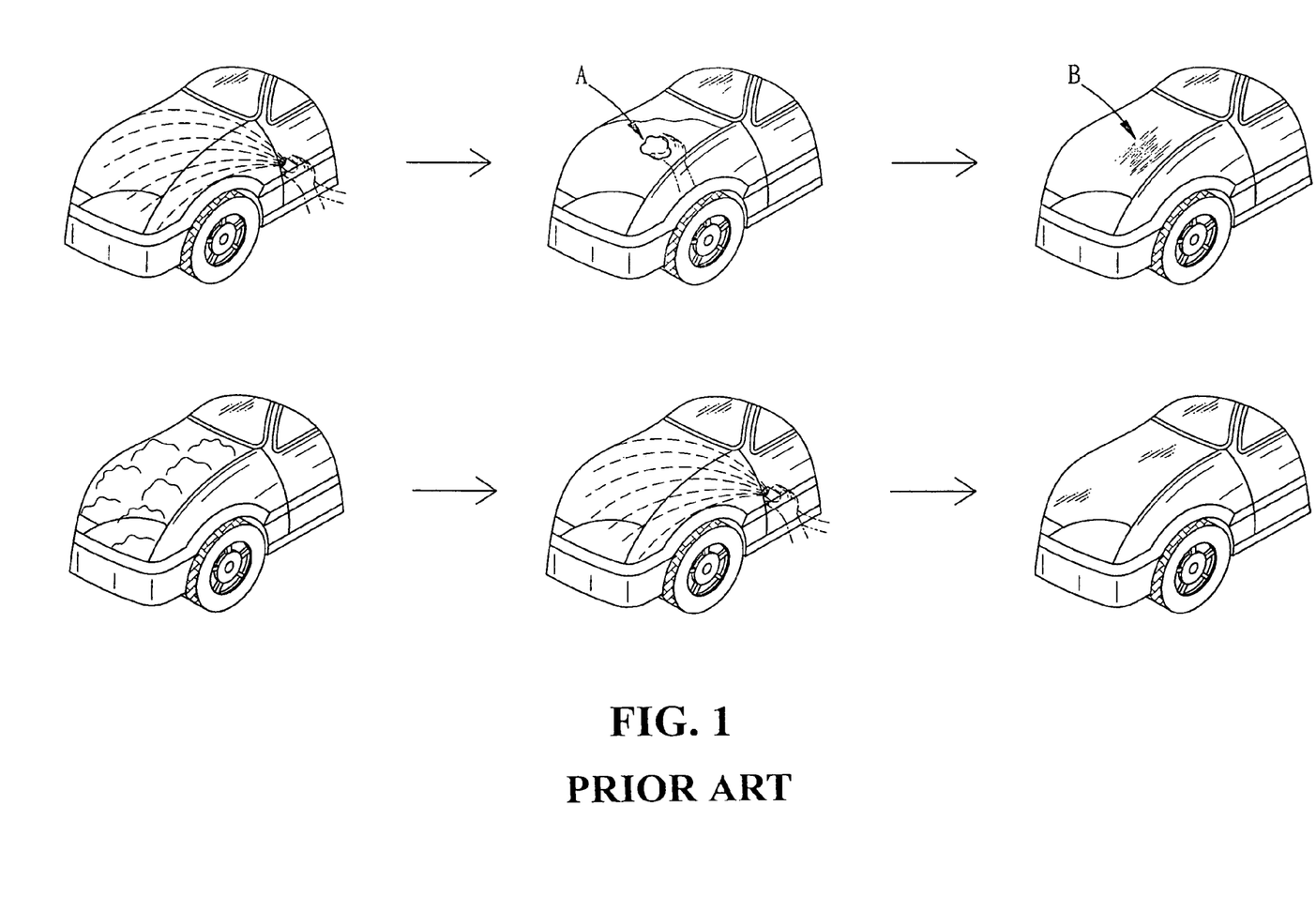
FIG. 1 is a diagram showing the cleaning process of prior arts.

Normally, if a car stays parking outdoors for a certain time, the car's surface finishes can easily get contaminated by substances stuck thereto, substances such as dust, sands, or other micro-particles that can hardly be cleaned by water only. One conventional way for easy cleaning (referring to FIG. 1) is to use water mixed with soap or detergent that is sprayed onto the car's surface finishes before a cleaning fabric or sponge is exerted to wipe away those superficially-bonded substances. However, this conventional method can only remove part of the micro-particles with lower adhesive ability, but fail to wipe away those micro-particles with higher adhesion. And this method can also cause scratches on the car's surface finishes. As a result, sandpaper is applied to remove those tough and superficially-bonded substances wherein the sandpaper abrades the car's surface finishes, which actually mars the car's surfaces while wiping those superficially-adhered substances away there-from. Recently, wax has been applied to ground the car's surface finishes so as to remove the substances bonded thereto. This method, however, also destroy the car's surface finishes to clean the hard-to-remove substances. Although the damage to the car's surface finishes is relatively lower than that caused by the sandpaper, this method also takes much longer time and energy as well. Furthermore, clay article A for cleaning purpose is seen on the market wherein the clay article A is equipped with the adhesive property to viscously grip the superficially-bonded substances. Although the clay article A can save more time than the wax in the cleaning job, the clay article A is equipped with an oily property and tends to stick onto the car's surface, leaving behind residues B thereon. Thus, cleaning liquid or detergent is required to clean the residues before water is applied to wash them away from the surface and cleaning fabric or sponge is used to wipe them clean, which not only wastes a lot of water but also causes pollution because of the detergent applied.

A Taiwan Patent with a Publication No. 1247801 discloses a mixture article 10 which can remove superficially-bonded substances 91 in a more efficient and convenient way. However, in the processing thereof, the mixture article 10 requires higher manufacturing temperature so as to bond various elements together. Consequently, the different elements are apt to generate chemical changes, and a great amount of exhaust will be emitted in the process. Besides, the high-temperature manufacturing process will uneconomically boost the cost of production as well.

SUMMARY OF THE PRESENT INVENTION

It is, therefore, the primary purpose of the present invention to provide a mixture article for cleaning superficially-adhered substances, consisting of colloid material, resin, abrasive powders, stabilizer, fibers, and natural turpentine that are bonded together to form a mixture article having high density and high binding, cohesive and adhesive capacities; whereby, to clean superficially-adhered substances from surfaces of various objects, the mixture article is easily exerted by wiping to generate a shoveling effect and, thus, remove substances toughly adhered onto a working surface, economically saving both time and energy for cleaning thereof.

It is, therefore, the second purpose of the present invention to provide a mixture article for cleaning superficially-adhered substances wherein the natural turpentine is equipped with the property that can not only boost the cohesive and adhesive power of the mixture article, but also reduce the manufacturing temperature required in the molding of the mixture article, cutting down the cost of production as well as fitting to environmental protection requirement thereby. Besides, the fibers thereof can keep the completeness of the mixture article as a whole so that the mixture article won't get broken when deformed by squeezing or stretching force exerted thereon, efficiently achieving the benefit of superior cleaning superficially-adhered substances thereby.

DETAILED DESCRIPTION OF THE PREFERRED EMBODIMENTS

Figure 2:
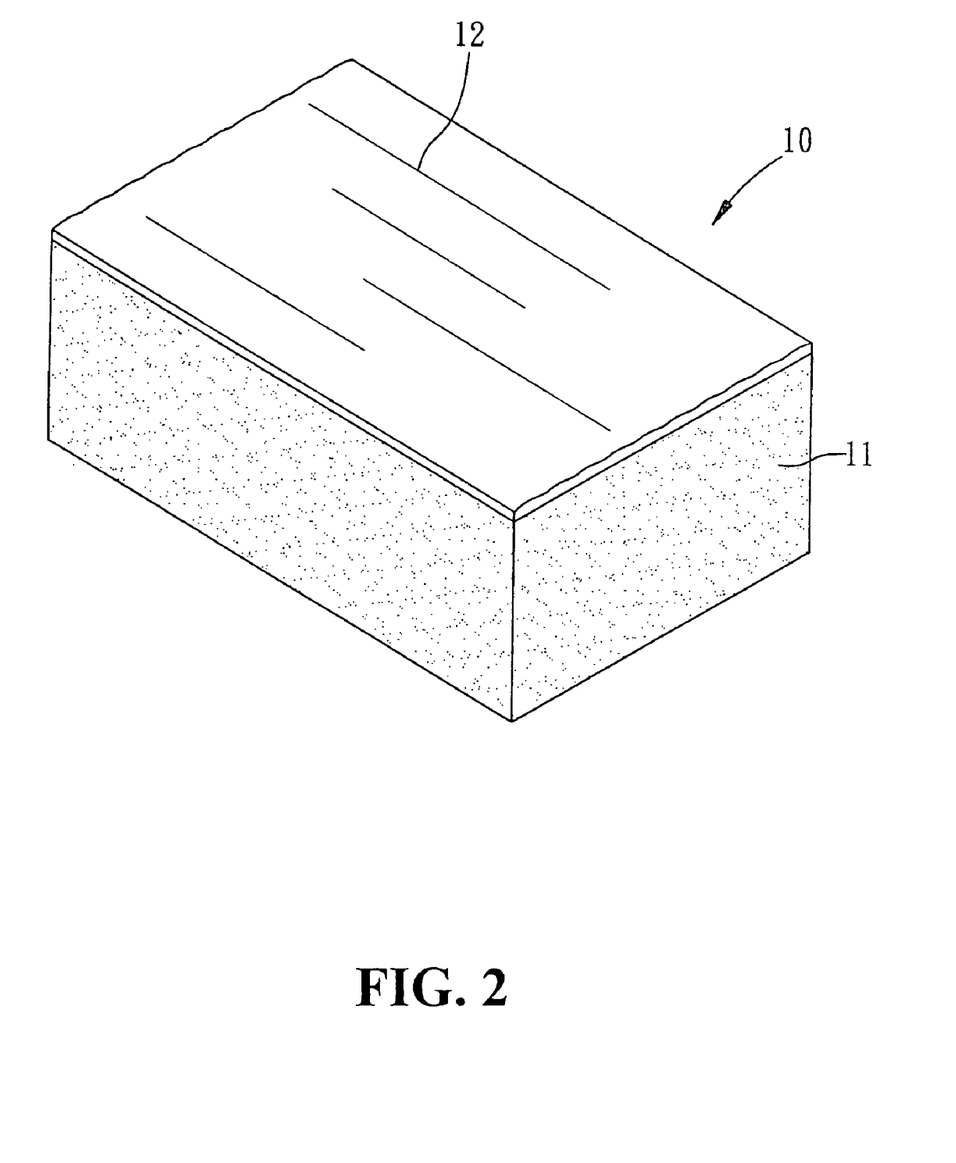
FIG. 2 is a perspective view of the present invention.
Figure 3:
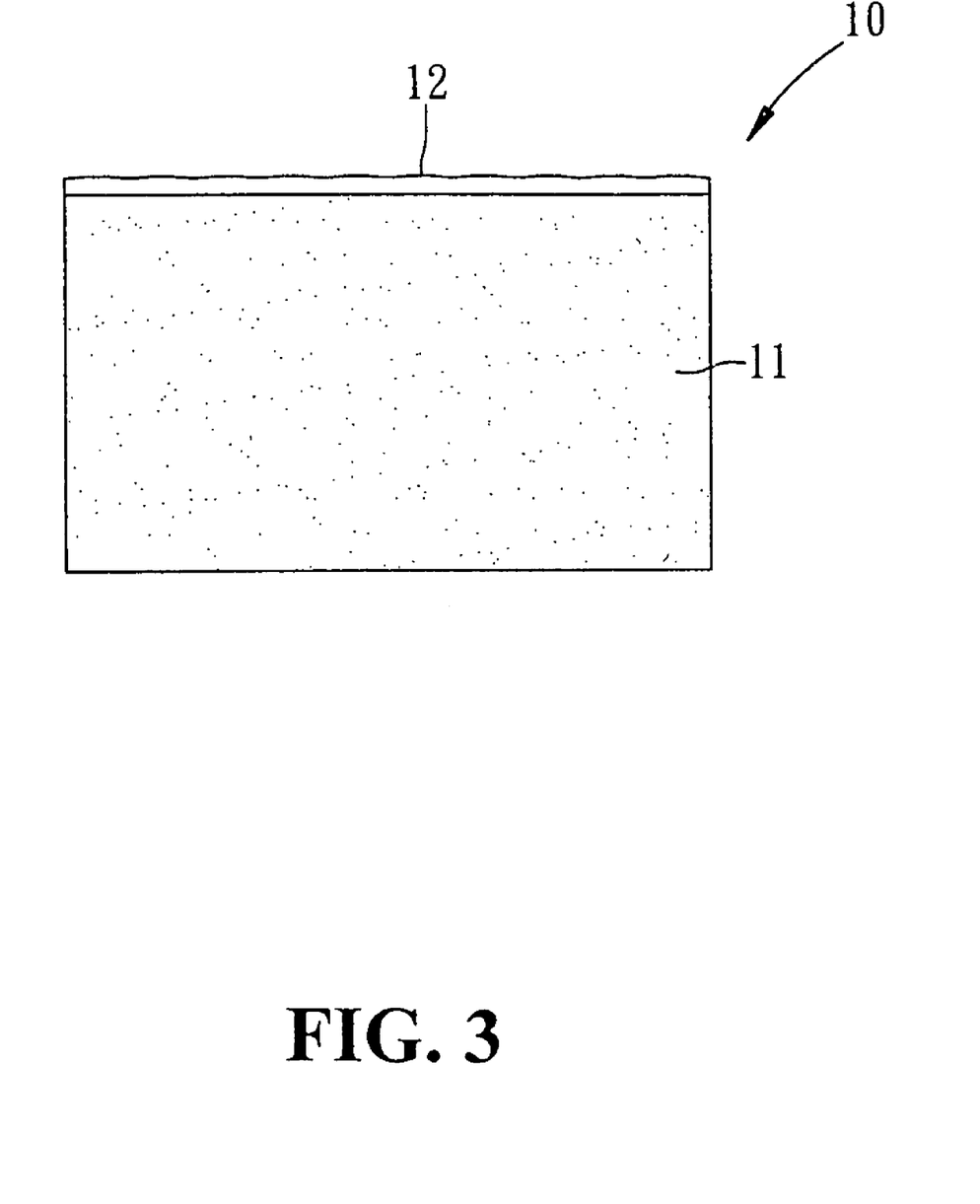
FIG. 3 is a lateral side view of the present invention.

Please refer to FIG. 2 showing a perspective view of the present invention (accompanied by FIG. 3). The present invention relates to a mixture article for cleaning superficially-adhered substance, comprising a mixture article 10 mounted to a sponge body 11 or other sorts of items like foam, fabric, paper, or a duster, etc. to be held by hands for cleaning superficially-adhered substances bonded onto the surfaces of various objects. The mixture article 10 has the surface defined by uneven and irregular texture thereon, and consists of colloid material (25 wt %-60 wt %), resin (10 wt %-20 wt %), abrasive powders (15 wt %-30 wt %), stabilizer, a slight amount of fibers, and natural turpentine wherein the colloid material composes the main element of the mixture article 10. The colloid material thereof can be made of silicone gel, medical-used white glue, hot-melt adhesive, or rubber, etc., that is in a solid and soft state at room temperature and has the property of adhesion to bond with the other elements and provide buffering and adhesive abilities in operation thereof. The resin added into the mixture article 10 is made of eco-friendly nature resin, providing the mixture article 10 with appropriate adhesion, elasticity, and coherence thereby. The abrasive powders thereof can be composed of calcium carbonate, iron oxide, alumina, silicon carbide, quartz or carbon powders, etc. wherein different sorts of abrasive powders formed into various crystallized shapes are utilized to effectively remove substances adhered onto a wide range of different surfaces. Besides, the grain diameter of the abrasive powders is determined by the working surface and the kinds of the substances adhered thereto. When the grain diameter of the abrasive powders remains lower than 0.1 mm, the larger the grain diameter is, the more effective it is to remove the superficially-adhered substances. Meanwhile, it can easily scratch the working surface as well. On the contrary, the smaller the grain diameter is, the easier it is to avoid the risk of scratching the working surface. But, it can also reduce the capacity to remove the adhered substances. Therefore, the average grain diameter of the abrasive powders had better remain under 0.001 mm. And to protect a special working surface and avoid the danger of scratching situation (e.g. the surface finishes of cars), the abrasive powders had better have an average grain diameter kept under 0.0003 mm. The stabilizer can be composed of calcium oxide, wax, alumina, white-lime or other materials having a firm property or with high heat capacity. The stabilizer is utilized to prevent the mixture article 10 from getting affected by a high temperature working surface as well as to lubricate and adjust the consistency of the mixture article 10. The stabilizer also serves as an insulator to avoid chemical changes occurring to the components of the mixture article 10 thereof. The fibers can be made of cotton or silk so as to maintain the completeness of the mixture article 10 as a whole, and to prevent the mixture article 10 from getting broken when deformed by squeezing or stretching force exerted thereon. The natural turpentine can boost the cohesive and adhesive properties of the components thereof to form the mixture article 10 having high density and high binding, cohesive and adhesive capacities as well. Besides, the natural turpentine has the property that can greatly reduce the manufacturing temperature in the processing of the mixture article 10 so as to prevent chemical changes occurring thereby and cut down the emission of exhaust, achieving environmental protection benefit thereby.

Figure 4:
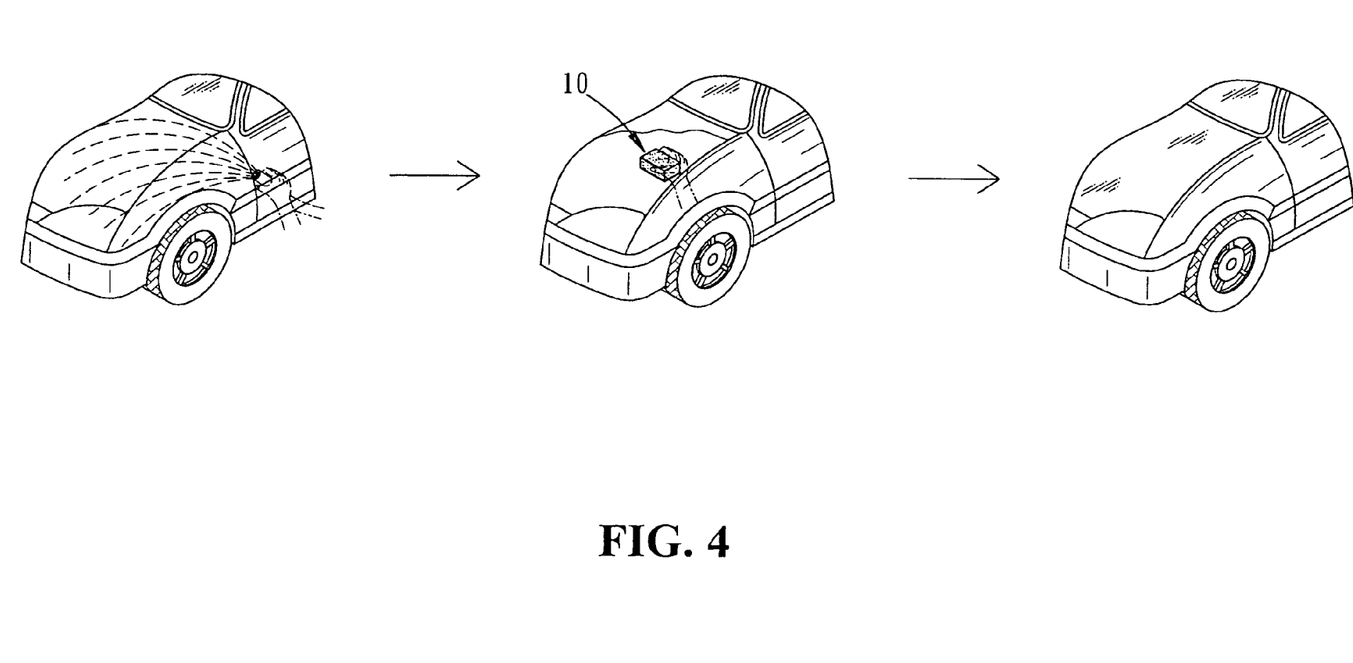
FIG. 4 is a diagram showing the cleaning process of the present invention.
Figure 5:
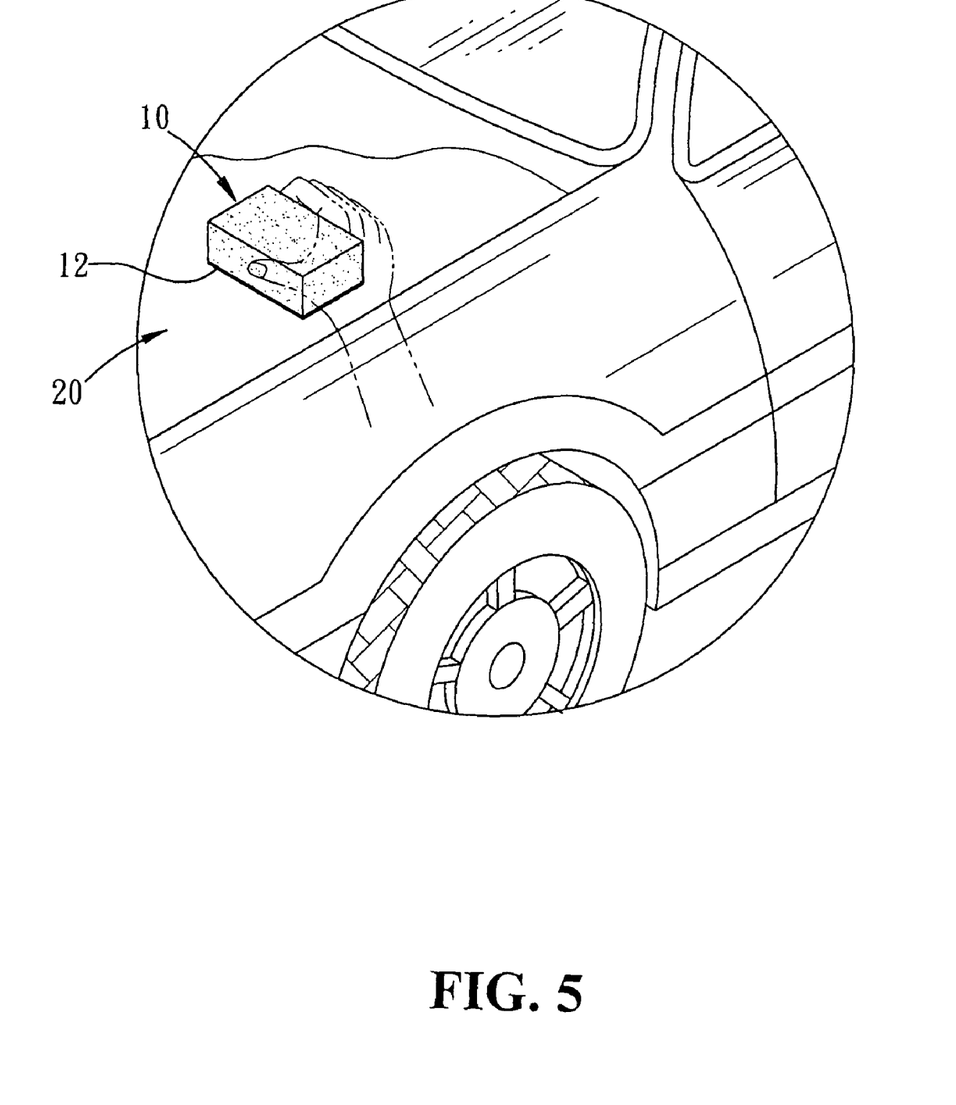
FIG. 5 is an enlarged view of a mixture article of the present invention wiping onto a working surface.
Figure 6:
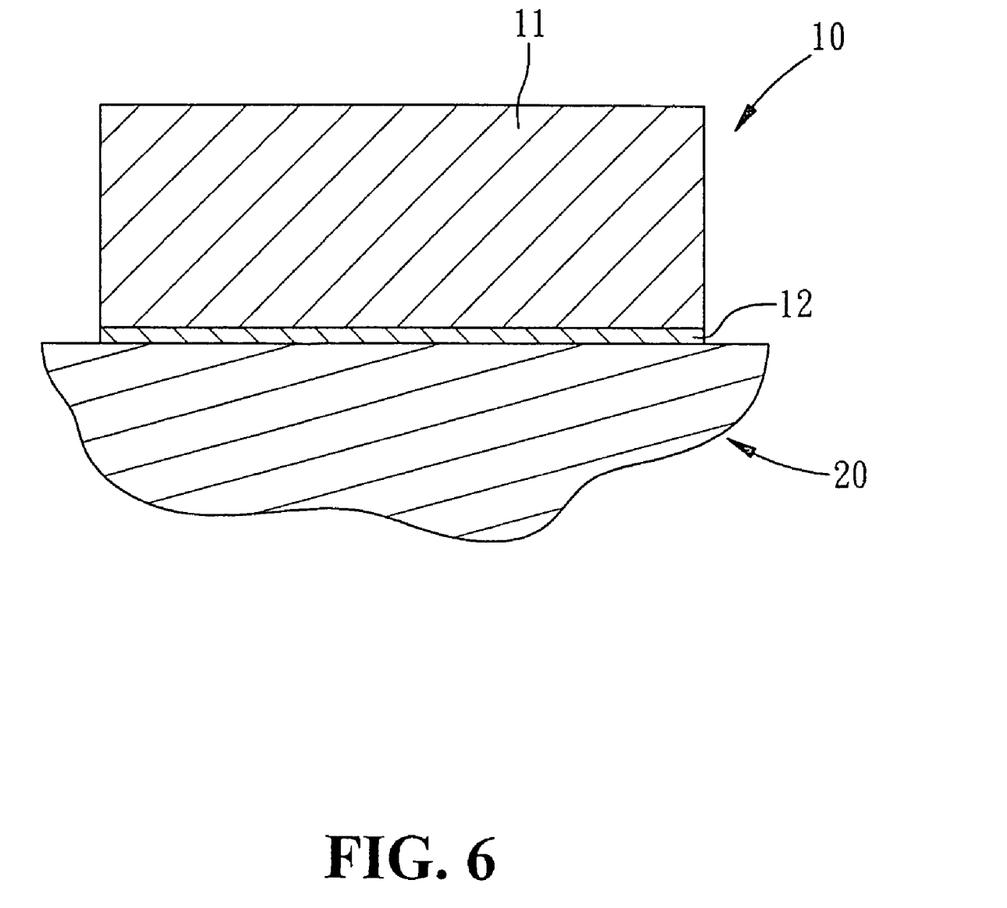
FIG. 6 is a cross sectional view of the mixture article of the present invention abutting against the working surface thereon.

Please refer to FIGS. 4 to 6 inclusive. To remove superficially-adhered substances from a working surface 20 such as the surface finishes of cars, bikes, furniture, glass or metals, etc., a user only needs to exert the sponge 11 serving to buffer and evenly distribute the force applied thereon, permitting the cleaning surface of the mixture article 10 to precisely correspond to the substances bonded onto the working surface 20. Part of the adhered substances squeezed by the mixture article 10 will get encapsulated thereby. And the different-crystallized abrasive powders and carbon powders added to the mixture article 10 can boost the suction power between the mixture article 10 and the working surface 20 so that the mixture article 10 can contact with the adhered substances to generate a shovel-like effect and shovel up the adhered substances from the working surface 20. Then, the adhesion property of the colloid material and resin will viscously grip the adhered substances to clean up the working surface 20. And the static electricity generated by the friction on the surface of the colloid material will easily suck up the adhered substances. Thus, without great force exerting thereon, the mixture article 10 can wipe off toughly adhered substances and clean them from the working surface 20 in an easy and effortless manner. After the cleaning job is done, the mixture article 10 can be simply washed by water to clean the microparticles adhered thereto so that the mixture article 10 can be repeatedly applied to enhance its durability thereby.

Figure 7:
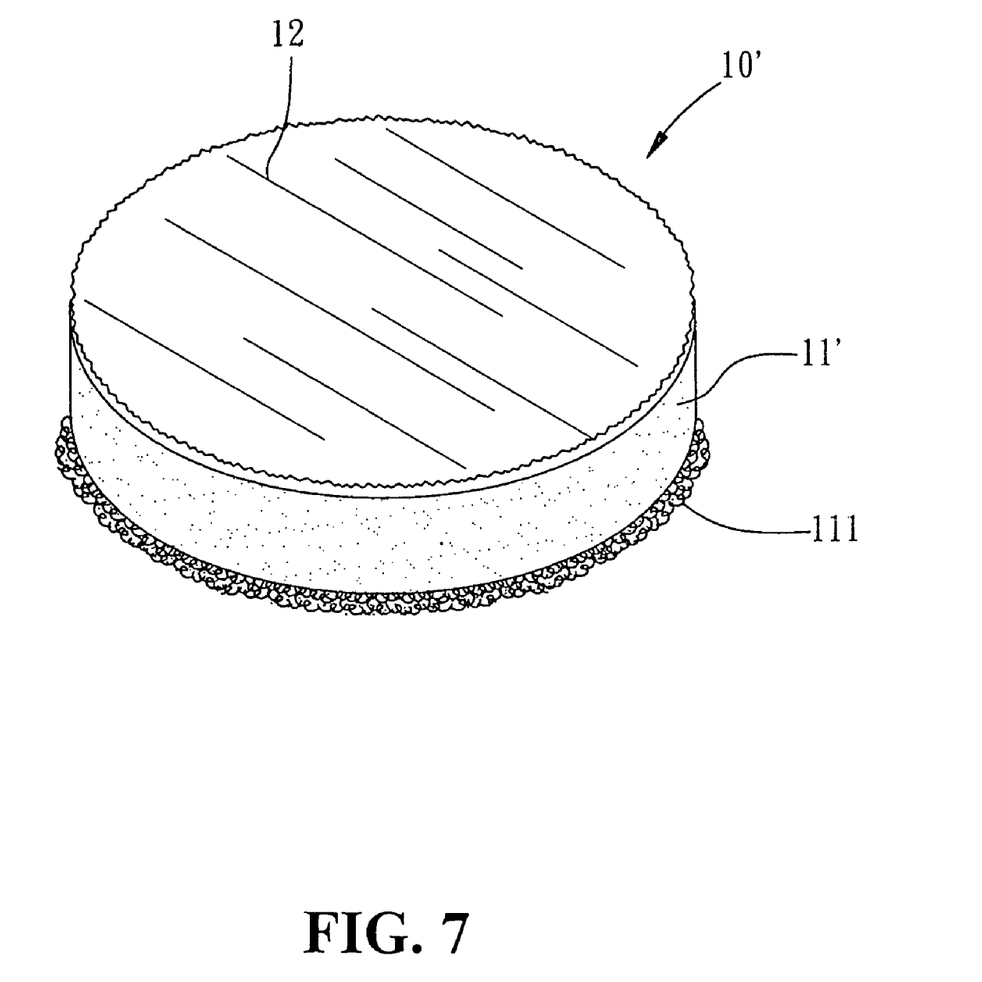
FIG. 7 is a perspective view of another embodiment of the present invention.
Figure 8:
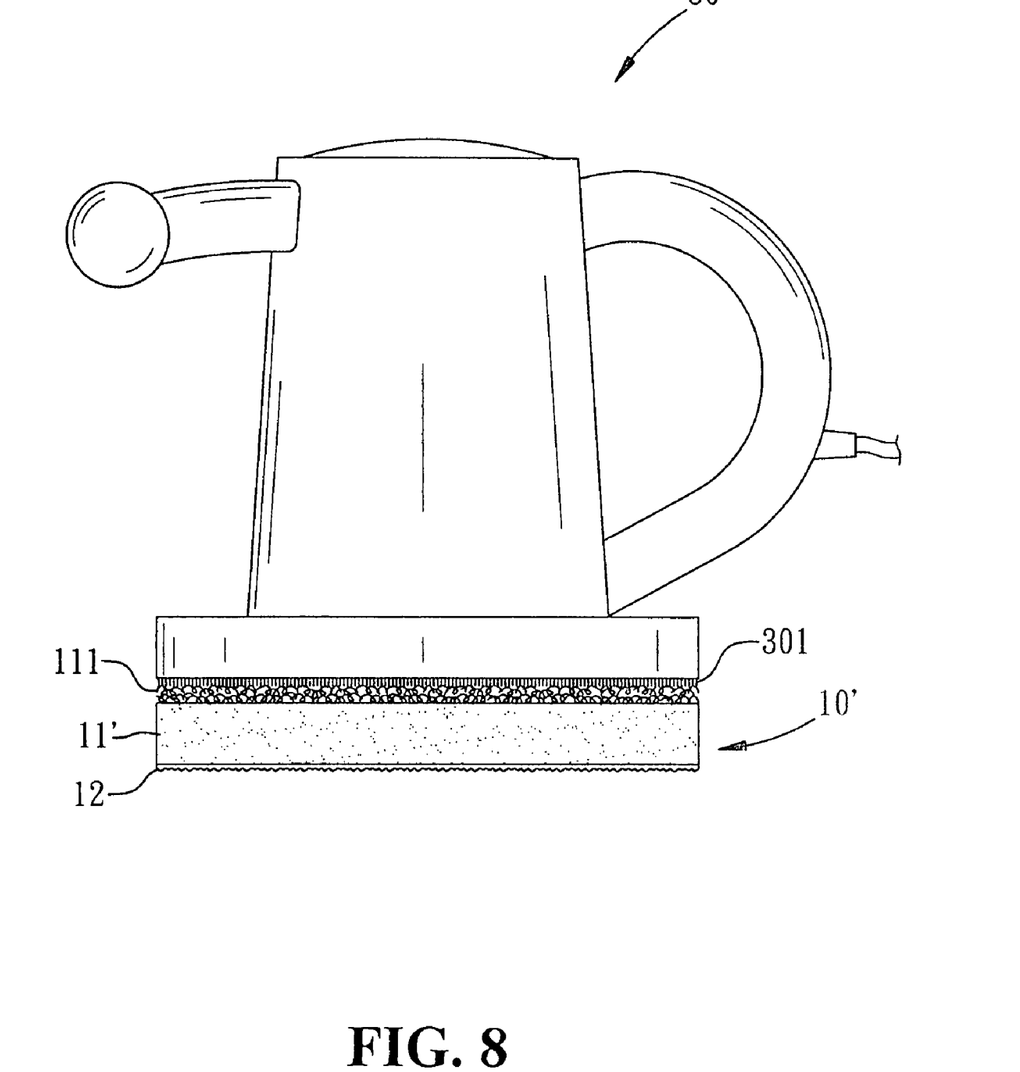
FIG. 8 is a diagram showing the mixture article of FIG. 7 mounted to a waxing device.
Figure 9:
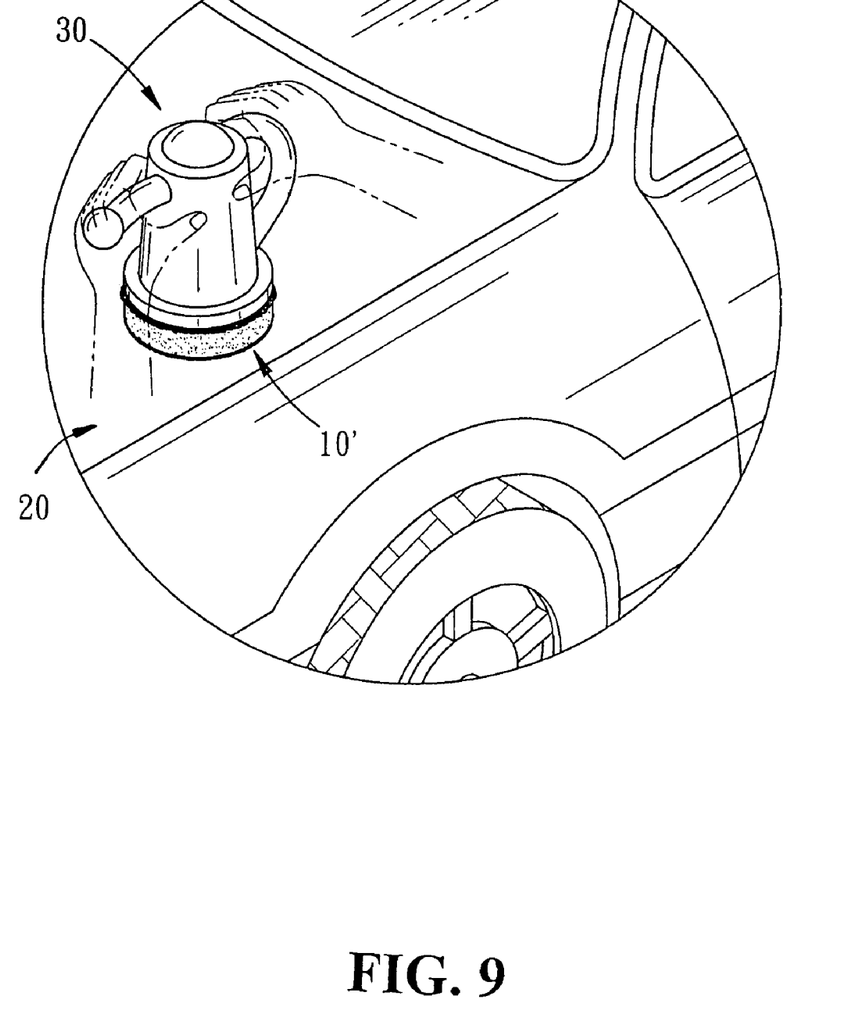
FIG. 9 is a diagram showing the operation of the present invention as shown in FIG. 7.

Please refer to FIGS. 7, 8. The present invention can also include a mixture article 10' mounted to one side of a circular sponge body 11' equipped with a fastening portion 111, and the circular sponge body 11' is fitted to a polishing (waxing) device 30 having a fastened portion 301 disposed thereon. The fastening portion 111 and the fastened portion 301 can be respectively molded of a hoop and loop fastener binding to each other thereby, permitting the polishing (waxing) device 30 to combine with the mixture article 10' into one unit and form a polishing surface with high density and adhesion for washing or waxing onto the working surface 20 according to the maintenance requirements of a user as shown in FIG. 9. Thus, the mixture article 10' can be utilized to achieve polishing and waxing effects. Besides, the mixture article 10' is defined by the uneven and irregular texture 12 having adhesive gaps formed among the ribs thereof that can also viscously grip and remove fine dust from the working surface 20 in the polishing or waxing process. In application, the mixture article 10, 10' can also be flexibly mounted to different devices equipped with either manual or automatic options, achieving widespread and convenient application as well as eco-friendly and energy-saving economical benefits thereby.

What is claimed is:

1. A cleaning mixture composition for cleaning superficially-adhered substances, consisting of:
    colloid material (25 wt %-60 wt %),
    resin (10 wt %-20 wt %),
    abrasive powders (15 wt %-30 wt %),
    stabilizer,
    fibers, and
    natural turpentine that are bonded together to form said cleaning mixture composition, said cleaning mixture composition having high density and high binding, cohesive, and adhesive capacities, wherein the natural turpentine greatly reduces a manufacturing temperature in the processing of the cleaning mixture composition and lowers an emission of exhaust of the manufacturing of said cleaning mixture composition, wherein the abrasive powders boost a suction power between the cleaning mixture composition and a working surface so as to shovel up the substances adhered onto the working surface, wherein the colloid material and the resin are equipped with an adhesion property to viscously grip the substances bonded onto the working surface so as to remove them there-from for cleaning purpose.

2. The cleaning mixture composition as claimed in claim 1 wherein the colloid material comprises at least one of the following: silicone gel, medical-used white glue, and hot-melt adhesive.

3. The cleaning mixture composition as claimed in claim 1 wherein the abrasive powders comprises at least one of the following: carbon powders, calcium carbonate, iron oxide, alumina, silicon carbide, and quartz.

4. The cleaning mixture composition as claimed in claim 1 wherein the abrasive powders comprise different crystallized shapes.

5. The cleaning mixture composition as claimed in claim 1 wherein the stabilizer comprises at least one of the following: calcium oxide, wax, alumina, and white-lime.

6. The cleaning mixture composition as claimed in claim 1 wherein the fibers comprise at least one of the following: cotton and silk.

7. The cleaning mixture composition as claimed in claim 1 wherein the cleaning mixture composition is mounted to at least one of the following: a sponge body, foam, fabric, paper, and a duster.

8. The cleaning mixture composition as claimed in claim 1 wherein the cleaning mixture composition includes a surface defined by a texture.

9. The cleaning mixture composition as claimed in claim 1 wherein the cleaning mixture composition is mounted to one side of a sponge body equipped with a fastening portion to fit to a polishing or waxing device having a fastened portion disposed thereon, said cleaning mixture composition permitting the polishing or waxing device to combine with the cleaning mixture composition into one unit and form a polishing surface equipped with high density and adhesion capacity.

10. The cleaning mixture composition as claimed in claim 9 wherein the sponge body is molded into a circular shape.

11. The cleaning mixture composition as claimed in claim 9 wherein the fastening portion of the sponge body and the fastened portion of the polishing or waxing device are respectively made of a hoop and loop fastener to bind to each other thereby.

12. The cleaning mixture composition as claimed in claim 9 wherein the cleaning mixture composition includes a surface defined by an irregular and uneven texture thereon.

* * * * *